United States Patent

Normann et al.

[11] Patent Number: 6,034,597
[45] Date of Patent: Mar. 7, 2000

[54] PROCESS FOR EVALUATING THE SIGNALS FROM A TIRE PRESSURE MONITORING SYSTEM

[75] Inventors: Norbert Normann, Niefern-Öschelbronn; Gunter Lothar Schulze, Ispringen; Ralf Kessler, Pfinztal; Andreas Kühnle, Knittlingen, all of Germany

[73] Assignee: Ami Doduco GmbH, Pforzheim, Germany

[21] Appl. No.: 09/242,214

[22] PCT Filed: Jul. 18, 1997

[86] PCT No.: PCT/EP97/03848

§ 371 Date: Apr. 12, 1999

§ 102(e) Date: Apr. 12, 1999

[87] PCT Pub. No.: WO98/05518

PCT Pub. Date: Feb. 12, 1998

[30] Foreign Application Priority Data

Aug. 7, 1996 [DE] Germany ............ 196 31 783

[51] Int. Cl.[7] .................................................. B60C 23/00
[52] U.S. Cl. ................. 340/447; 340/442; 73/146.5
[58] Field of Search ............................ 340/442, 447, 340/445; 73/146, 146.5, 146.8

[56] References Cited

U.S. PATENT DOCUMENTS

| | | | |
|---|---|---|---|
| 4,467,641 | 8/1984 | Abraham | 73/146.5 |
| 5,289,160 | 2/1994 | Fiorletta | 340/447 |
| 5,600,301 | 2/1997 | Robinson, III | 340/442 |
| 5,612,671 | 3/1997 | Mendez | 340/477 |
| 5,731,754 | 3/1998 | Lee, Jr. et al. | 340/447 |
| 5,900,809 | 5/1999 | Hebert | 340/442 |

FOREIGN PATENT DOCUMENTS

| | | |
|---|---|---|
| 0763437 | 3/1997 | European Pat. Off. . |
| 3605097 | 8/1986 | Germany . |
| 4205911 | 9/1996 | Germany . |
| 1968478 | 5/1997 | Germany . |
| 9420317 | 9/1994 | WIPO . |

*Primary Examiner*—Edward Lefkowitz
*Attorney, Agent, or Firm*—Dvorak & Orum

[57] ABSTRACT

A method for processing signals of a tire pressure monitoring system on vehicles on each of whose N wheels (R1 through R5) a transmitter is mounted and a reception antenna (1 through 5) which is connected to the input of a common receiver (8) is allocated to each transmitter in its vicinity, the transmitters transmitting, at time intervals, data telegrams which contain an individual identifier and a data portion following the latter. The signals received simultaneously from the reception antennas (1 through 5) and having the same identifier are conveyed in summed fashion to the receiver (8), alternately from all N reception antennas (1 through 5) and from N–1 reception antennas (1, 2, 4, 5), such that the one reception antenna (3) whose signal is blanked out of the sum of the signals is selected by cyclical transposition from the total number N of reception antennas (1 through 5). Then the intensity of the summed signals is determined, the intensity of the sums of N–1 signals is compared in each case to the intensity of the sum of N signals, and an identification is made of that reception antenna (3) from which the signal has come whose blanking from the signal sum brings about the greatest intensity loss (D1 through D5). Lastly, the signal having the relevant individual identifier is allocated to that reception antenna (3) and to the wheel (R3) allocated to it.

20 Claims, 2 Drawing Sheets

PROCESS FOR EVALUATING THE SIGNALS FROM A TIRE PRESSURE MONITORING SYSTEM

BACKGROUND OF THE INVENTION

1. Field of the Invention

The present invention is based on a method for pressing signals of a tire pressure monitoring system.

2. Description of the Prior Art

A method of this kind is known from WO 93/16891, and operates with a "wheel electronics package," mounted on the respective wheel, which contains a pressure sensor, a circuit for processing the pressure measurement signal, a transmitter with transmission antenna, and a battery, in combination with reception antennas, associated with the wheels, which are connected to a common "control device" in the body which contains a common receiver for the reception antennas, an analysis circuit, and a display unit. In order for the control device to be able to assign the received signals unequivocally to the respective wheels of the vehicle, each wheel electronics package equips the signals that it sends out with an individual identifier (identification signal). For this purpose, the wheel electronics packages generate signals divided into four segments, comprising a preamble (synchronization portion of the signal); the identification signal (identifier), in particular in the form of an identification number; a measurement signal which provides information concerning the measured tire pressure; and a postamble constituting the end of the signal (CRC signal). In order to be able to determine, on the basis of the identification signal, the wheel from which a signal is coming, according to WO 93/16891 an initialization is first performed during which the respective identification signal associated with the respective wheel position is stored in the control device. In order to perform this initialization, the tire pressure monitoring system must be switched into a "pairing mode," and then each individual transmitter must be activated in sequence. The system is then switched back into its measurement mode until the transmitter positions change as a result of a wheel change. In other words, a suitably trained person must perform the initialization at each wheel change. Wheel changes in any repair shop or at home are therefore, in some circumstances, impossible or possible only at the risk of safety. Correct functioning of the tire pressure monitoring system cannot be guaranteed due to possible operating errors.

In WO 93/08036 the problem is circumvented by recording the data from the pressure sensors and the transmission electronics connected thereto not with the aid of the central control device provided in the vehicle, but rather with the aid of a remote control element which has an LCD display device allowing the tire pressure to be read off. To determine the tire pressure, the desired information must be ascertained at each individual wheel with the aid of the remote control element. The known method does offer the advantage of unequivocal allocation of the measured values, but does not allow monitoring of the tire pressure while driving.

OBJECTS AND SUMMARY OF THE INVENTION

It is the object of the present invention to indicate a method with which, in a telemetrically operating tire pressure monitoring system, the tire pressure of each wheel of the vehicle can be signaled and automatically allocated by a control device to the correct wheel.

When a wheel electronics package sends out a signal with a data telegram, the latter can then be intercepted simultaneously by all the reception antennas and forwarded to the receiver in the central control device of the tire pressure monitoring system. According to the present invention, the signals coming in via the various reception antennas are processed not individually but rather together, and evaluated as to signal intensity for purposes of allocation to a specific wheel. For this purpose, the signals coming in via the various reception antennas are summed and are conveyed as a sum to the receiver, and the intensity of the summed signal is determined and compared to the intensity of a summed signal constituted by switching not all N reception antennas, but rather temporarily only N−1 reception antennas, to the input of the receivers. The reception antenna which is disconnected from the input of the receiver is changed cyclically, so that each of the reception antennas is disconnected from the receiver once in a process cycle. The antenna whose deactivation results in the greatest intensity loss in the summed signal is normally that antenna which is located closest to the transmitting wheel electronics package, and thus receives the signal with the greatest field strength. The reception antenna whose deactivation results in the greatest intensity loss is therefore allocated to the transmitting wheel electronics package and thus to that wheel on which the wheel electronics package is mounted, but preferably only if the intensity loss exceeds a specific minimum value; this ensures that shielding effects due to an unfavorable position of the wheel electronics package with reference to the reception antenna located closest to it do not cause one of the other reception antennas to be allocated incorrectly to the transmitting wheel electronics package, since it is receiving the strongest signal only because the reception antenna that is actually in closest proximity is momentarily shielded by the unfavorable position of the transmitting wheel electronics package.

The invention has, however, not only the advantage of a high degree of allocation reliability, but also the advantage of high analysis reliability. Because the receiver in the central analysis device receives and processes the signals from the reception antennas not individually, but rather in summed fashion, the field strength received by it is higher than in the case of an individual antenna. If the field strength received by a reception antenna should at any point in time be too low for the connected receiver, which would then result in a signal outage, the situation is then improved, according to the present invention, by the fact that all the reception antennas simultaneously make their contribution to the input signal for the receiver. This applies in particular to the case in which the reception antenna located closest to the transmitting wheel electronics package is in "radio shadow" due to an unfavorable wheel position, and the received field strength thus decreases substantially. This danger exists in particular at higher vehicle speeds, since then, as the wheel rotation becomes faster, the possibility increases that the wheel electronics package will be rotated at least temporarily into an unfavorable position during the emission of its data telegram. Despite the fluctuations in signal field strength causally linked to the wheel rotation, when the invention is applied it is sufficient for reliable data reception if a sufficiently strong signal is received only at some of the reception antennas.

If the central analysis device already knows the correct allocation of identifiers to the wheels, then there is no further need to blank out any of the antenna channels in order to analyze the data telegrams in the sum of the received signals; such blanking is necessary, however, if the allocation must be determined for the first time. Thereafter it is sufficient, at time intervals $T_E$ which may be large by comparison with the period $T_s$ within which the wheel electronics packages send their data telegrams, to re-check the allocation of identifiers to the wheels so as to detect automatically whether and when the allocation has changed, for example due to a wheel change. It is thus possible, to determine the allocation of the identifiers to the wheels each time a vehicle is started, but thereafter, and until the vehicle is shut down, not to blank out any further antenna channels, but rather to convey the signals of all N wheels to the receiver and thereby attain the maximum received field strength.

The probability that individual data or even complete signals may fail to reach the receiver is thus extraordinarily low when the invention is applied.

The allocation method according to the present invention could be carried out, in the case of a signal with a specific identifier, by first allowing the signal to pass through to the receiver on all N antenna channels in order to determine the maximum signal intensity. In the subsequent transmissions of the signal with the same identifier, one of the antenna channels can be respectively blanked out in sequence in order to identify the reception antenna whose blanking results in the greatest intensity loss. The allocation method is more reliable, however, if a signal reception without blanking of an antenna channel is processed before and after each reception of a signal with one blanked-out antenna channel, and the intensity of the signal processed with the blanked-out antenna channel is compared to the mean of the intensities of the signals received immediately before and after it without blanking of an antenna channel. Fluctuations in the signal intensity caused by wheel rotation can thereby be at least partially compensated for.

If a cycle during which each antenna channel has been blanked out once does not lead to an unequivocal result, the cycle is repeated. It may also be advantageous, however, to analyze several cycles a priori in order to increase the allocation reliability.

BRIEF DESCRIPTION OF THE DRAWING FIGURES

A circuit arrangement for carrying out the method according to the present invention is described below with reference to the appended drawings.

FIG. 1 shows a block diagram of the circuit arrangement, and

FIG. 2 schematically shows a signal sequence occurring in the course of the method according to the present invention.

DETAILED DESCRIPTION OF THE PREFERRED EMBODIMENTS

Figure 1:
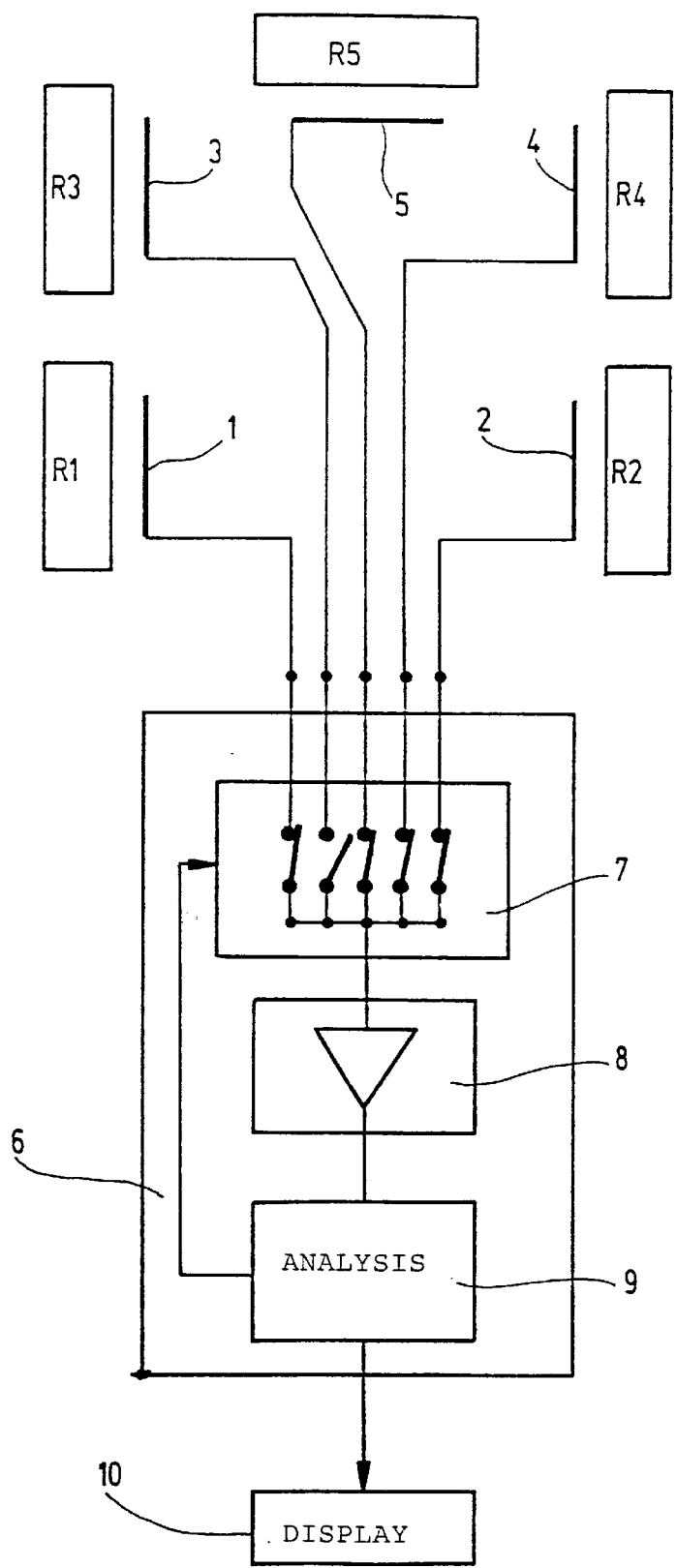

FIG. 1 shows five wheels R1, R2, R3, R4, and R5 of a vehicle, of which R5 is a spare wheel. A reception antenna 1 is allocated to wheel R1, a reception antenna 2 to wheel R2, a reception antenna 3 to wheel R3, a reception antenna 4 to wheel R4, and a reception antenna 5 to wheel R5. The reception antennas are located on the body, preferably in the wheel wells. Five coaxial lines lead from reception antennas 1 through 5 to a central control device 6 which is arranged in the body, for example behind the dashboard, and contains a multiplexer 7, a receiver 8, and an analysis circuit 9 which in turn is connected to a display unit 10 which can be one or more indicator lights or an LCD panel.

Multiplexer 7 is configured so that it can individually interrupt the lines coming from antennas 1 through 5. In the example shown, the line coming from reception antenna 3 is interrupted.

Figure 2:
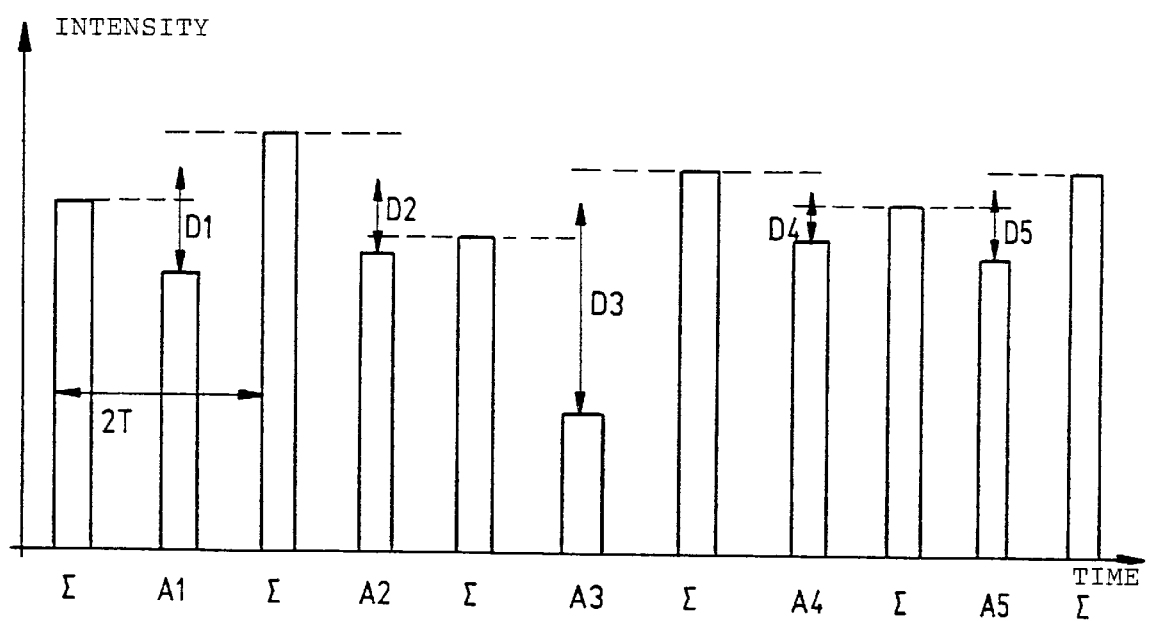

This allows a procedure such as the one depicted, for example, in FIG. 2. At regular time intervals 2T, the signal that is sent by a wheel electronics package with a period T is received by all N=5 antennas and allowed by multiplexer 7 to pass through to receiver 8 on all five channels. At time intervals 2T, receiver 8 thus receives a summed signal Σ, supplied by all the antennas 1 through 5 together, with maximum intensity. In between, however, at every second signal sent by the wheel electronics package, one of the antenna channels is interrupted by multiplexer 7 and thus the signal component coming from the pertinent reception antenna is blanked out, resulting in an intensity loss D. The signals with the intensity decreased in this fashion are labeled A1 through A5 in FIG. 2, the signal that was blanked out being the signal of antenna 1 in case A1, the signal of antenna 2 in case A2, the signal of antenna 3 in case A3, the signal of antenna 4 in case A4, and the signal of antenna 5 in case A5.

The analysis circuit then detects the intensity loss resulting from the blanking of an antenna signal. Since the signal intensity of the summed signal Σ fluctuates because the wheel position is continuously changing, the mean value of the intensities of the summed signals Σ immediately before and after blanking of an antenna channel is created as a reference variable to determine the intensity loss resulting from blanking of that antenna channel. The intensity losses D1, D2, D3, D4, and D5, the magnitudes of which are depicted in FIG. 2 by the length of the respective double arrow, are thereby determined in analysis circuit 9. By far the greatest intensity loss occurs upon blanking of the signal arriving from antenna 3. The signal in question with the selected identifier is therefore allocated to wheel R3 and to its wheel electronics package.

A corresponding procedure is used for the signals having the other four identifiers, which come from the other four wheels R1, R2, R4, and R5.

To ensure that no data loss results from the switching of multiplexer 7, the switching times are synchronized with the trailing signal edge of a data output of analysis circuit 9.

The signals are depicted in simplified fashion in FIG. 2 in rectangular form; in fact, as explained initially, they usually comprise a preamble, an identifier (identification number), the measured data, and the postamble, which together constitute a data telegram.

We claim:

1. A method for processing signals of a tire pressure monitoring system on vehicles on each of whose N wheels (R1 through R5) a transmitter is mounted and a reception antenna (1 through 5) which is connected to the input of a common receiver (8) is allocated to each transmitter in its vicinity, the transmitters transmitting, at time intervals, data telegrams which contain an individual identifier and a data portion following the latter, wherein the signals received simultaneously from the reception antennas (1 through 5) and having the same identifier are conveyed in summed fashion to the receiver (8), alternately from all N reception antennas (1 through 5) and from N−1 reception antennas (1, 2, 4, 5), such that the one reception antenna (3) whose signal is blanked out of sum of the signals is selected by cyclical transposition from the total number N of reception antennas (1 through 5);

the intensity of the summed signals is determined, the intensity of the sums of N−1 signals is compared in each case to the intensity of the sum of N signals, and an identification is made of that reception antenna (3)

from which the signal has come whose blanking from the signal sum brings about the greatest intensity loss (D1 through D5); and the signal having the relevant individual identifier is allocated to that reception antenna (3) and to the wheel (R3) allocated to it.

2. The method as defined in claim 1, wherein the intensity of the complete signals is determined as long as the summed signal remains strong enough, despite the blanking of the signal coming from a reception antenna (3), that the input field strength necessary for the selected receiver (8) is still attained with the summed signal of the remaining N−1 reception antennas (1, 2, 4, 5).

3. The method as defined in claim 1 wherein the signals which are blanked out in cyclical interchange are blanked out only after the identifier has been received, and the intensities of the summed signals are accordingly determined only from the remaining signal portion which follows thereafter.

4. The method as defined in claim 1, wherein the intensity of the sum of N−1 signals is compared to the mean of the intensities of the sum of the group of the previous N signals and of the group of the subsequent N signals.

5. The method as defined in claim 1, wherein the transmitters send their data telegrams with a period $T_S$; and the cycle of blanking one signal out from the sum of the simultaneously occurring signals is repeated with a period $T_E$ which is large by comparison with the period $T_S$.

6. The method as defined in claim 1, wherein a signal with a specific identifier is allocated to a specific wheel (R3) only if the greatest intensity difference (D3) exceeds a minimum value.

7. The method as defined in claim 2, wherein the signals which are blanked out in cyclical interchange are blanked out only after the identifier has been received, and the intensities of the summed signals are accordingly determined only form the remaining signal portion which follows thereafter.

8. The method as defined in claim 2, wherein the intensity of the sum of N−1 signals is compared to the mean of the intensities of the sum of the group of the previous N signals and of the group of the subsequent N signals.

9. The method as defined in claim 2, wherein the transmitters send their data telegrams with a period $T_S$: and the cycle of blanking one signal out from the sum of the simultaneously occurring signals is repeated with a period $T_E$ which is large by comparison with the period $T_S$.

10. The method as defined in claim 2, wherein a signal with a specific identifier is allocated to a specific wheel only if the greatest intensity difference exceeds a minimum value.

11. The method as defined in claim 3, wherein the intensity of the sum of N−1 signals is compared to the mean of the mean of the intensities of the sum of the group of the previous N signals and of the group of the subsequent N signals.

12. The method as defined in claim 3, wherein the transmitters send their data telegrams with a period $T_S$; and the cycle of blanking one signal out from the sum of the simultaneously occurring signals is repeated with a period $T_E$ which is large by comparison with the period $T_S$.

13. A circuit arrangement for carrying out the method as defined in claim 1 in a system for tire pressure monitoring on vehicles, having wheel electronic packages, mounted on the wheels (R1 through R5), each with a pressure sensor, a circuit for processing the pressure reading supplied thereby, a battery, and a transmitter;

N reception antennas (1 through 5) mounted on the body in the vicinity of the wheels (R1 through R5); and a control device (6), mounted in the body, to which all the reception antennas (1 through 5) are connected, wherein the control device (6) contains a combination of a receiver (8) and a multiplexer (7), upstream therefrom, which has a separate input for each of the N reception antennas (1 through 5) and in which the N inputs can be deactivated individually and switched to a common input of the receiver (8).

14. The circuit arrangement as defined in claim 13, wherein the inputs of the multiplexer (7) can be deactivated cyclically.

15. The circuit arrangement as defined in claim 13, wherein alternately one input and then no input of the multiplexer (7) can be deactivated.

16. The circuit arrangement as defined in claim 13, wherein the receiver (8) triggers the multiplexer (7) with a pulse derived from the trailing edge of the received signals.

17. The circuit arrangement as defined in claim 14, wherein alternately one input and then no input of the multiplexer can be deachivated.

18. A circuit arrangement for carrying out the method as defined claim 2, in a system for tire pressure monitoring on vehicles, having wheel electronic packages, mounted on the wheels, each with a pressure sensor, a circuit for processing the pressure reading supplied thereby, a battery, and a transmitter;

N reception antennas mounted in the body, to which all the reception antennas are connected, wherein the control device contains a combination of a receiver and a multiplexer, upstream therefrom, which has a separate input for each of the N reception antennas and in which the N inputs can be deactivated individually and switched to a common input of the receiver.

19. The circuit arrangement as defined in claim 14, wherein alternately one input and then no input of the multiplexer can be deactivated.

20. The circuit arrangement as defined in claim 14, wherein the receiver triggers the multiplexer with a pulse derived from the trailing edge of the received signals.

\* \* \* \* \*